United States Patent Office 3,294,877
Patented Dec. 27, 1966

3,294,877
VAPOR PHASE SINTERING PROCESS
Joseph P. Hammond, Knoxville, Tenn., assignor to the United States of America as represented by the United States Atomic Energy Commission
No Drawing. Filed Feb. 15, 1966, Ser. No. 529,175
9 Claims. (Cl. 264—.5)

This application is a continuation-in-part of one copending application S.N. 320,237, filed October 30, 1963, and now abandoned.

The invention described herein was made in the course of, or under a contract with the U.S. Atomic Energy Commission. This application and its parent case, filed October 30, 1963, relate to an improved process for sintering metal powders including refractory metal compounds. By sintering is meant the operation by which a compacted powder is transformed into a more dense object, and includes all phenomena which act to increase cohesion of the heated mass of powder with or without application of pressure.

In order to achieve maximum density of powder compacts of refractory metal and refractory metal compounds, cermets and the like, extremely high sintering temperatures are required. As a general rule, the attainment of maximum density is best achieved by selection of a powder feed having an extremely fine range of particle size and a maximum surface area. However, the benefit of using such powders is countervailed by the high rate of grain growth encountered at high sintering temperatures. This high rate of grain growth is deleterious since grain boundaries tend to by-pass and lock in intergranular voids, thus reducing the sintered density and mechanical strength of the finally formed body. Another obstacle toward the attainment of high density is the surface oxide and gas contamination which are partciularly prevalent in reactive powders of the micron and sub-micron size range. It is virtually impossible to provide a powder feed of this desired particle shape and size which does not have at least some of these surface contaminants. As a practical matter, the surface oxides impede the mechanism deemed essential to mass transport, and, as a result, higher temperatures are required to effect sintering. Hydrogen gas is frequently used in an attempt to reduce surface oxide contamination, and hence increase sintering efficiency, but this expedient has not yet appeared to have beneficial effects on the more reactive metals and compounds. The problem is especially difficult where sintering is relied on as the sole means for achieving densification, such as where the finally desired body is in the form of pellets, small rods or tubes, or the like. For example, some forms of solid nuclear fuel elements are fabricated by powder metallurgical techniques into pellets or rods utilizing the powder feed of a refractory nuclear fuel selected from the carbide, nitride, phosphide, or silicide of uranium and/or plutonium. In such cases, the nature of the finally fabricated body is such that the principal, if not only, means of achieving maximum densification is by the sintering process.

Maximum densification of refractory materials by solid state sintering up to the theoretical density of a material can only be achieved at exceedingly high temperatures, generally at a temperature within 90% of the absolute melting point. For uranium monocarbide, a satisfactorily high degree of densification (in excess of 90 percent of theoretical density) is achievable only at temperatures of the order of 2000° C.; for uranium mononitride, UN, maximum densification is achievable only by solid state sintering at a temperature of about 2300° C. in a nitrogen atmosphere. Sustained operation at temperatures in this range is costly and impractical on a production scale. In the case of uranium mononitride, vacuum sintering is impractical because the UN disassociates or has an abnormally high vapor pressure at temperatures much above 1500° C. Similar difficulties are experienced in sintering other refractory metal powder such as uranium, plutonium, vanadium, tungsten, molybdenum, tantalum, columbium, zirconium, titanium, chromium, the carbides, nitrides, borides, silicides and phosphides of said metals and cermets based on said metals and metal compounds.

It is accordingly, an object of this invention to provide an improved process for sintering powdered compacts of the character described. A particular object is to provide a process of sintering powdered compacts at temperatures normally regarded as inoperable to achieve a desired degree of densification. Another object is to provide an improved solid state sintering process.

These and other objects of this invention are achieved by sintering a compact selected from a refractory metal, metal compound, and cermet thereof, preferably under vacuum, to a desired sintering temperature while exposing the sintering compact to a metal vapor during at least a portion of the time that said compact is being sintered.

I have found that the selected class of metal vapors, as hereinafter to be more fully described, enhances the sinterability of refractory powder compacts, as manifested by the attainment of a desired density at a temperature below the temperature required to achieve the same density in the absence of said metal vapor. Thus, in one case, whereas prior to this invention, sintering of uranium mononitride powder compacts at a temperature in the range 2300–2400° C. under a pressure of inert (nitrogen) atmosphere was required to achieve a density approaching the theoretical density of UN, the same density can be achieved in accordance with this invention by contacting a powder compact of UN under vacuum sintering conditions while exposing the sintering UN compound to a selected metal vapor at a temperature in the range 1500–1600° C.

The exact mechanism involved in sintering in the presence of a metal vapor atmosphere to effect in lowering of temperature needed to yield a body of a given density is not known. The improvement in sintering efficiency, as measured by a lowering of the required sintering density necessary to achieve maximum density, may be explainable in terms of a mixed chemical and physical effect. That is to say, it seems reasonable to assume in the light of the present theory, that the metal vapor acts as a reducing agent to convert and/or remove the surface oxides. Also, the metal vapor is thought to scavenge or cleanse the surface gas contaminants which inhibit the sintering and thereby lowering the sintering activation energy. A certain amount of diffusion of the metal vapor into the lattice of the material being sintered is also thought to occur in a manner which promotes volume diffusion effects, a process generally recognized as aiding the sintering process.

The class of metal vapors which alleviate the problems encountered at high temperature sintering by lowering the temperature needed to yield a body of given density is selected from a metal whose oxide has a higher negative free energy of formation than the oxide of the metal or of the metal component of the compound being sintered and which has a desirably high vapor pressure, i.e., in the range $10^{-5}$ to 50 millimeters of mercury at the selected sintering temperature. A further qualification of the selected vaporized metal is that its rate of oxide formation be such that it proceeds at a desirably high rate during the period of contact with the sintering body. By the term "desirably high rate" I do not refer directly to a measured rate of reaction, but rather to the result achieved in terms of effecting a lowering of the temperature needed to yield a body of a given density relative to the temperature needed to achieve the same density in the absence of the selected metal vapor.

The technique of introducing the metal vapor in the presence of, and in contact with, the body to be sintered or sintering body may be varied over a wide range of conditions. Consider, for example, a case where uranium monocarbide is to be vacuum sintered. The UC compact is placed in any conventional furnace such as a tantalum strip-heated vacuum furnace and a source of a selected metal vapor from the defined class is placed on the hearth of the furnace or in a separate receptacle within the furnace. The furnace is energized and vacuum is applied while the compact is being heated to the sintering range of temperature, vacuum being produced by an oil-diffusion pump backed up by a conventional mechanical pump. As soon as the metal vaporizes, a rather sudden rise in pressure will be noted, and, as the pumping continues, it will be found that the ultimate attainable vacuum will be higher generally by a factor of about 10 as compared to the ultimate vacuum achieved in the absence of the selected metal vapor. Apparently, the metal vapor acts as a gas scavenger or "getter" to remove gaseous contaminants from the furnace atmosphere. Also, it seems to scavenge contaminants sorbed on the external and internal surfaces of the heated compact, thereby serving to enhance sinterability of the compact at the lower temperature. The concomitant reduction of a continuous surface oxide film is also thought to aid the efficiency of sintering.

It is preferable to place the metal vapor source in the furnace so that the generated vapor will sweep over and around the powder compact before it is exhausted from the furnace. In cases where most elegant control of the metal vapor pressure is desired, the source metal vapor may be located within a cool section of the furnace, wherein the metal vapor source comprises an electrically energizable metal coated tungsten filament.

This latter technique permits introduction of the vapor at a preselected time during the sintering period and also permits dosing the furnace atmosphere with a pre-selected concentration of metal vapor.

The source of metal vapor may comprise the metal per se or it may be in the form of an easily decomposable or reducible salt thereof. For example, where aluminum is the metal vapor to be used, one may use aluminum powder or a decomposable aluminum compound such as uranium, iron, or zirconium aluminide.

It should be noted that the particle size of the powder feed which forms the powder compacts to be sintered by this invention has a significant effect on the finally attained sintered density. In general, the finer the particle size of the feed powder, the higher will be the finally attained density when sintering in the presence of a selected metal vapor atmosphere. However, in all cases, the finally attained sintered density will be higher at a given sintering temperature when the sintering compact is in the presence of, and in contact with, a selected metal vapor atmosphere during at least a portion of the sintering cycle.

Having described and characterized my invention in general terms, the following specific embodiments will serve to show its application in specific cases.

EXAMPLE I

This example illustrates the utility of providing a metal vapor phase in accordance with this invention as an aid in the vacuum sintering of uranium mononitride, UN.

A batch of commercially-obtained uranium mononitride powder having an average particle size of 3.8 microns, as measured by Fisher sub-sieve analysis was divided into two portions. One portion was ball milled to an average particle size of 0.3 micron. The 3.8 micron size portion and the 0.3 micron size portion were then sub-divided equally into a total of four subportions. Each subportion was then separately slurried in a petroleum ether solution containing dissolved camphor equivalent to 2 weight percent of the UN present. The ether was evaporated leaving camphor-coated UN powder. The coated powder from each subportion was then cold pressed at 25 tons/square inch in a double acting die to yield pellets having a length/diameter ratio in excess of 1 and to a green strength as indicated in Table I below. A subportion from each batch was then vacuum sintered for three hours at 1550° C. at an average heating rate of 375° C. per hour in a vacuum furnace. At the end of this period, the pressure in the furnace was $10^{-6}$ millimeters mercury. The remaining subportions from each batch was then vacuum sintered in exactly the same manner except that, in these cases, a mass of uranium aluminide, $UAl_2$, was used as a source of aluminum vapor, in an amount equivalent to 10 weight percent of the UN. The source of aluminum vapor was placed in the sintering furnace near the green pressed pellets. The furnace was activated and vacuum applied; and, after three hours the pressure in the furnace was $10^{-7}$ millimeters mercury. All of the sintered pellets were cooled to room temperature at a rate of about 300° C. per hour. The densities of the sintered pellets were determined from weight and dimensional measurements, and are listed in Table I below.

*Table I*

| | Final Sintered Density of as received (3.8μ) UN, percent of theoretical | Final Sintered Density 0.3μ UN, percent theoretical |
| --- | --- | --- |
| Green Strength at 25 t.s.i. | 50.2 | 60 |
| Vacuum Sintered at 1,550° C. (no metal vapor) | 60 | 92 |
| Vacuum Sintered at 1,550° C. plus Al vapor | 66 | 95 |

It will be seen that the magnitude of finally attained sintered density in each case depends on the particle size of the feed powder as well as the presence of a metal vapor during the sintering process. The effect of the metal vapor with the coarser powder feed is clear; its effect on the finer powder is, by comparison, even more significant in that an appreciable increase in sintered density approaching the theoretical density is attained at a sintering temperature far below the sintering temperature heretofore regarded as necessary to achieve maximum densification.

EXAMPLE II

A batch of UN powder having an average particle size of 3-4 microns was ball milled into an average particle size of 0.3 micron and then consolidated into four pellets having a length/diameter ratio greater than 1 by the procedure described in Example I. Three of the pellets were vacuum sintered in an aluminum vapor atmosphere and one pellet was vacuum sintered in a beryllium vapor atmosphere. The results are summarized in Table II below.

Table II
FABRICATION RESULTS ON UN COMPACTS USING A REACTIVE VAPOR ATMOSPHERE AS SINTERING AID

| Run No. | Base Material | Vapor Source | Powder | | Sintering | | Density, Percent Theo. |
| | | | Milling Time, Days | Final Particle Size, Microns | Time, Hours | Temperature, °C | |
| --- | --- | --- | --- | --- | --- | --- | --- |
| 1 | UN | 10 wt. percent $UAl_2$ [1] | 6 | 0-3 | 3 | 1,550 | 95.0 |
| 2 | UN | 10 wt. percent $UAl_2$ | 6 | 0-3 | 6 | 1,550 | 96.5 |
| 3 | UN | 10 wt. percent $UAl_3$ | 6 | 0-3 | 3 [2] | 1,550 | 97.5 |
| 4 | UN | 2 wt. percent $UBe_{13}$ | 6 | 0-3 | 3 | 1,550 | 94.5 |

[1] Based on weight of UN charge.
[2] Sintered for an additional 3 hours at 1,700° C.

The results are in conformity with those achieved in Example I. In run 3 the pellets specimen was sintered for an additional three-hour period at 1700° C. to effect an even greater enhancement in sintered density to within 97.5% of the UN theoretical density.

EXAMPLE III

Prior to this invention, the attainment of maximum density of uranium carbide (in excess of 90% of theoretical density of UC, 13.63 grams/cc.) by solid state vacuum sintering or by sintering in an inert gas such as argon could not be attained at temperatures lower than about 1900° C., except possibly by the technique of sintering in the presence of a liquid phase. Vacuum or inert gas sintering at temperatures in the range 1600–1700° C. would produce consolidated compacts up to about 85 percent of the theoretical density depending upon the particle size of the feed powder. Higher density could, of course, be achieved at higher sintering temperatures but only at the risk of excess uranium loss by volatilization, excess grain growth and excess gaseous contamination. All of these problems are at least partially alleviated by the application of the method of this invention to the case of uranium monocarbide.

In this example, a batch of coarse uranium monocarbide powder was ball milled to an average particle size of 0.6 micron. The ball milled powder was separated into four portions and each portion was consolidated, as in Example I, to pellets having approximately the same green strength. Two of the pellets were vacuum sintered in the presence of aluminum vapor at a temperature of about 1600° C.; the third pellet was sintered at the same approximate temperature but in the presence of a beryllium vapor atmosphere and the fourth pellet was treated exactly as the other three except that the sintering temperature was 1700° C. After the sintered pellets were produced they were cooled to room temperature and density measurements were taken. The results are summarized in Table III below.

Table III
FABRICATION RESULTS ON UC COMPACTS USING A REACTIVE VAPOR ATMOSPHERE AS SINTERING AID

| Run No. | Base Material | Vapor Source | Powder | | Sintering | | Density, Percent Theo. |
| | | | Milling Time, Days | Final Particle Size, Microns | Time, Hours | Temperature, °C | |
| --- | --- | --- | --- | --- | --- | --- | --- |
| 1 | UC | 10 wt. percent $UAl_2$ | 1 | 0.6 | 3 | 1,600 | 93.0 |
| 2 | UC | Al vapor | 1 | 0.6 | 3 | 1,600 | 92.0 |
| 3 | UC | Be Vapor | 1 | 0.6 | 3 | 1,600 | 92.0 |
| 4 | UC | Be Vapor | 1 | 0.6 | 3 | 1,700 | 94.0 |

X-ray analysis and metallographic examination of each sintered body showed it to consist of substantially all uranium monocarbide.

EXAMPLE IV

Both arc-cast and $UO_2$-derived UC powders were prepared for pressing and sintering. The arc-cast powder was prepared by arc-melting high purity uranium and carbon several times. The carbon content of the arc-cast UC was 4.8±0.05%. The $UO_2$-derived material was prepared by carbon reduction of high purity $UO_2$ powders. The carbon content of the $UO_2$-derived material was 4.8±0.5%.

The UG, obtained as described above, was ball milled for 24 hours to yield a particle size of about 0.7 micron. The powders were coated with camphor and pressed into pellets one-half inch in diameter (length/diameter greater than 1). Pellets from both types of material were sintered in vacuum and in the presence of silicon vapors. The control pellets were sintered at a pressure of $10^{-6}$ torr in the absence of silicon vapor. All sinterings were carried out in tantalum-lined graphite crucibles for three hours at 1600° C., using tungsten on BeO as the setter material. The results obtained using the subject technique are illustrated in Table IV below. The densities stated in the Table are average measurements taken on two samples.

Table IV
FABRICATION RESULTS OF SINTERING UC IN SILICON VAPOR

| Run | Source of Material | Sintering Atmosphere | Density, percent of Theoretical |
| --- | --- | --- | --- |
| 1 | Arc-Cast | Vacuum | 89.6 |
| 2 | do | Si Vapor | 94.0 |
| 3 | $UO_2$-derived | Vacuum | 91.6 |
| 4 | do | Si Vapor | 94.6 |

It is clear from the preceding description that there is now provided a method for at least partially alleviating the several well-known problems involved in sintering of refractory metal powders of the class described which are ordinarily sintered to high density at temperatures of the order of 2000° C. and above. By sintering such materials in the presence of, and in contact with, a selected metal vapor of the defined class, the attainment of satisfactorily high sintered density at temperatures several hundred degrees lower than has heretofore been thought possible is now a reality. Since compacts of refractory metal and/or refractory metal compounds show impractically low densification at the low sintering temperatures permitted by this invention in the absence of the selected metal vapor, it is apparent that the presence of the selected metal vapor is instrumental in activating sintering said compacts. The method of this invention, therefore, constitutes a significant improvement in the art of solid state sintering and provides a useful alternate and/or supplementary technique for effecting maximum sintering density of refractory metal powders at a minimal sintering temperature.

The process of this invention is applicable to metal powders in groups IIIa, IVa, Va, VIa, VIIa, and VIIIa of the Periodic Table as shown on page 1821 of Webster's New International Dictionary, second edition; the rare earth metals having an atomic number from 57–71, and uranium and plutonium as well as refractory metal compounds made from said aforementioned refractory metals. Examples of enhanced sintering has already been shown with respect to nitrides and carbides. Similar benefits will be evident by sintering borides, sulfides, silicides, and cermet compositions containing the aforementioned materials in a selected metal vapor atmosphere.

Having thus described my invention, I claim:

1. An improved method of forming a uranium carbide compact to a desired density which comprises sintering said compact in the presence of and in contact with a vaporized metal atmosphere, said vaporized metal being selected from a metal whose oxide has a higher negative free energy of formation than uranium dioxide, and being further characterized in that it has a vapor pressure of at least $10^{-5}$ millimeters mercury at the sintering temperature.

2. The method according to claim 1 wherein the metal vapor is beryllium vapor.

3. The method according to claim 1 wherein the metal vapor is aluminum vapor.

4. The method according to claim 1 wherein the metal vapor is silicon vapor.

5. The method according to claim 1 in which the uranium carbide is uranium monocarbide.

6. An improved method of sintering a uranium nitride compact to a desired density which comprises heating said compact in the presence of and in contact with a vaporized metal atmosphere at a temperature below the temperature required to reach said desired sintered density in the absence of said atmosphere, said vaporized metal being selected from a metal whose oxide has a higher negative free energy of formation than uranium dioxide and being further characterized in that it has a vapor pressure of at least $10^{-5}$ millimeters mercury at the sintering temperature.

7. The method according to claim 5 wherein the metal vapor is aluminum vapor.

8. The method according to claim 5 wherein the metal vapor is beryllium vapor.

9. The method according to claim 5 wherein the metal vapor is silicon vapor.

No references cited.

L. DEWAYNE RUTLEDGE, *Primary Examiner.*

R. L. GRUDZIECKI, *Assistant Examiner.*